US010080228B2

(12) United States Patent
Ouchi et al.

(10) Patent No.: US 10,080,228 B2
(45) Date of Patent: Sep. 18, 2018

(54) RADIO COMMUNICATION SYSTEM, BASE STATION APPARATUS, MOBILE STATION APPARATUS AND RADIO COMMUNICATION METHOD (71) Applicant: SHARP KABUSHIKI KAISHA, Osaka-shi, Osaka (JP)

(72) Inventors: Wataru Ouchi, Osaka (JP); Tatsushi Aiba, Osaka (JP); Shoichi Suzuki, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 7 days.

(21) Appl. No.: 15/073,462

(22) Filed: Mar. 17, 2016

(65) Prior Publication Data
US 2016/0205687 A1 Jul. 14, 2016

Related U.S. Application Data (62) Division of application No. 13/576,962, filed as application No. PCT/JP2011/050571 on Jan. 14, 2011, now abandoned.

(30) Foreign Application Priority Data

Feb. 4, 2010 (JP) ................................. 2010-022794

(51) Int. Cl.
*H04W 4/00* (2018.01)
*H04W 72/04* (2009.01)
(Continued)

(52) U.S. Cl.
CPC ........ *H04W 72/0453* (2013.01); *H04B 1/713* (2013.01); *H04B 7/04* (2013.01);
(Continued)

(58) Field of Classification Search
CPC .................................................... H04B 7/0602
See application file for complete search history.

(56) References Cited

U.S. PATENT DOCUMENTS 8,351,347 B2  1/2013 Noh et al.
8,374,213 B2  2/2013 Ro et al.
(Continued)

FOREIGN PATENT DOCUMENTS

EP    2 023 504 A2    2/2009
JP    2012-527152 A   11/2012
(Continued)

OTHER PUBLICATIONS

Ericsson, "Sounding RS", TSG-RAN WG1 #50, R1-073729, Athens, Greece, Aug. 20-24, 2007.
(Continued)

*Primary Examiner* — Kevin C Harper
(74) *Attorney, Agent, or Firm* — Birch, Stewart, Kolasch & Birch, LLP (57) ABSTRACT

It is realized to transmit a reference signal for channel estimation a predetermined number of times with one signaling. In a radio communication system including a base station apparatus and a mobile station apparatus, the base station apparatus transmits a radio resource control signal including information indicating a number of times of transmission of the reference signal for channel estimation to the mobile station apparatus, and transmits a physical downlink control channel including information indicating transmission of the reference signal to the mobile station apparatus, and the mobile station apparatus transmits the reference signal to the base station apparatus until a number of times of transmission of the reference signal reaches the number of times of transmission, according to information indicating the number of times of transmission, which is included in the radio resource control signal, when the
(Continued)

information indicating transmission of the reference signal is included in the physical downlink control channel.

4 Claims, 6 Drawing Sheets

(51) Int. Cl.
| | | |
|---|---|---|
| *H04B 7/04* | (2017.01) | |
| *H04J 11/00* | (2006.01) | |
| *H04W 74/00* | (2009.01) | |
| *H04W 76/04* | (2009.01) | |
| *H04W 76/27* | (2018.01) | |
| *H04B 1/713* | (2011.01) | |
| *H04L 5/00* | (2006.01) | |
| *H04W 88/02* | (2009.01) | |
| *H04W 88/08* | (2009.01) | |

(52) U.S. Cl.
CPC ............ *H04J 11/00* (2013.01); *H04L 5/0048* (2013.01); *H04L 5/0053* (2013.01); *H04L 5/0091* (2013.01); *H04W 74/004* (2013.01); *H04W 74/006* (2013.01); *H04W 76/046* (2013.01); *H04W 76/27* (2018.02); *H04L 5/0012* (2013.01); *H04L 5/0023* (2013.01); *H04W 72/0406* (2013.01); *H04W 88/02* (2013.01); *H04W 88/08* (2013.01)

(56) References Cited

U.S. PATENT DOCUMENTS

| | | | |
|---|---|---|---|
| 8,542,647 | B2 | 9/2013 | Noh et al. |
| 8,976,836 | B2 | 3/2015 | Ro et al. |
| 2008/0014892 | A1* | 1/2008 | Aldana ................ H04B 7/0691 455/277.1 |
| 2009/0042615 | A1* | 2/2009 | Teo ...................... H04B 7/0691 455/562.1 |
| 2009/0274110 | A1* | 11/2009 | Teo ...................... H04B 7/0691 370/329 |
| 2009/0316756 | A1 | 12/2009 | Ro et al. |
| 2010/0009707 | A1 | 1/2010 | Porat |
| 2010/0111215 | A1 | 5/2010 | Nandagopalan et al. |
| 2010/0195532 | A1 | 8/2010 | Pajukoski et al. |
| 2010/0246561 | A1* | 9/2010 | Shin .................... H04W 52/32 370/345 |
| 2011/0098054 | A1 | 4/2011 | Gorokhov et al. |
| 2012/0008588 | A1 | 1/2012 | Chung et al. |
| 2012/0014349 | A1 | 1/2012 | Chung et al. |
| 2012/0063426 | A1 | 3/2012 | Noh et al. |
| 2012/0069812 | A1 | 3/2012 | Noh et al. |
| 2012/0076037 | A1 | 3/2012 | Noh et al. |
| 2012/0076115 | A1 | 3/2012 | Noh et al. |
| 2012/0106493 | A1 | 5/2012 | Noh et al. |
| 2012/0182957 | A1 | 7/2012 | Noh et al. |
| 2012/0218967 | A1 | 8/2012 | Noh et al. |
| 2012/0224557 | A1 | 9/2012 | Noh et al. |
| 2012/0263129 | A1 | 10/2012 | Noh et al. |
| 2012/0281625 | A1 | 11/2012 | Noh et al. |
| 2012/0307757 | A1 | 12/2012 | Edler Von Elbwart et al. |
| 2013/0094448 | A1 | 4/2013 | Noh et al. |
| 2013/0107840 | A1 | 5/2013 | Ro et al. |

FOREIGN PATENT DOCUMENTS

| | | |
|---|---|---|
| JP | 2013-514687 A | 4/2013 |
| WO | WO 2008/156293 A2 | 12/2008 |
| WO | WO 2009/154415 A2 | 12/2009 |

OTHER PUBLICATIONS

Ericsson, ST-Ericsson, "Uplink Power Control for Carrier Aggregation", 3GPP TS RAN WG1 Meeting #59bis, R1-100045, Valencia, Spain, Jan. 18-22, 2009.

Huawei, "Channel Sounding Capacity Improvements", 3GPP TSG RAN WG1 meeting #59 bis, R1-100808, Valencia, Spain, Jan. 18-22, 2010.

Mitsubishi Electric, "Antenna selection with a frequency-hopped or variable bandwidth sounding reference signal", 3GPP RAN1#50, R1-073357, Aug. 20-24, 2007, Athens, Greece.

Mitsubishi Electric, "UL Sounding RS Protocol Design for Antenna Selection". 3GPP RAN1#50, R1-073356, Aug. 20-24, 2007, Athens, Greece.

Motorola, "PDCCH Formats and Contents", 3GPP TSG RAN1 #52, R1-080730, Sorrento, Italy, Feb. 11-15, 2008.

Nokia Siemens Networks, "Channel sounding enhancements for LTE-Advanced", 3GPP TSG RAN WG1 Meeting #59, R1-094653, Jeju, Korea, Nov. 9-13, 2009.

Nokia Siemens Networks, Nokia, "Channel sounding enhancements for LTE-Advanced", 3GPP TSG RAN WG1 Meeting #59bis, R1-100337, Valencia, Spain, Jan. 18-22, 2010.

Samsung, "Configuring SRS Transmissions in Rel. 10", 3GPP TSG RAN WG1 #59bis, R1-100133, Valencia, Spain, Jan. 19-23, 2010.

Sharp, "UL Multi-Antenna SRS Design Impact for low SNR & estimation error", 3GPP TSG RAN WG1 Meeting #59bis, R1-100169, Valencia, Spain, Jan. 18-22, 2010.

US Advisory Action from U.S. Appl. No. 13/576,962 dated Jun. 10, 2015.

US Final Office Action from U.S. Appl. No. 13/576,962 dated Feb. 18, 2015.

US Non-Final Office Action from U.S. Appl. No. 13/576,962 dated Jan. 27, 2014.

US Office Action from U.S. Appl. No. 13/576,962 dated Aug. 20, 2014.

US Office Action from U.S. Appl. No. 13/576,962 dated Dec. 17, 2015.

Nokia Siemens Networks et al., "UL sounding", 3GPP TSG RAN WG1 Meeting #49, R1-072296, Kobe, Japan, May 7-11, 2007, 4 pages.

Samsung, "SRS Enhancements in Rel 10", 3GPP TSG RAN WG1 #59bis, R1-100134, Valencia, Spain, Jan. 19-23, 2010, pp. 1-3.

* cited by examiner

FIG.5

RADIO COMMUNICATION SYSTEM, BASE STATION APPARATUS, MOBILE STATION APPARATUS AND RADIO COMMUNICATION METHOD

This application is a Divisional of copending application Ser. No. 13/576,962 filed on Sep. 4, 2012, which was filed as PCT International Application No. PCT/JP2011/050571 on Jan. 14, 2011, which claims the benefit under 35 U.S.C. § 119(a) to Patent Application No. 2010-022794, filed in Japan on Feb. 4, 2010, all of which are hereby expressly incorporated by reference into the present application.

TECHNICAL FIELD

The present invention relates to a radio communication system including a mobile station apparatus and a base station apparatus, and in particular, to a transmission control method of a reference signal for channel estimation for the mobile station apparatus.

BACKGROUND ART

Conventionally, a radio access system and a radio network that achieves higher-speed data communication (hereinafter referred to as "Long Term Evolution-Advanced (LTE-A)" or "Advanced Evolved Universal Terrestrial Radio Access (A-EUTRA)") by use of evolution of a radio access system and a radio network in cellular mobile communication (hereinafter referred to as "Long Term Evolution (LTE)" or "Evolved Universal Terrestrial Radio Access (EUTRA)"), and by use of a wider frequency band than the LTE have been discussed in the 3rd Generation Partnership Project (3GPP).

In the LTE-A, proposed is a reference signal for channel estimation transmitted only when a transmission request is notified from a base station apparatus (A-SRS: Aperiodic Sounding Reference Signal) in addition to a reference signal for channel estimation transmitted at a periodical timing set by the base station apparatus (P-SRS: Periodic Sounding Reference Signal) (non-patent document 1).

[Non-patent document 1] "Channel sounding enhancements for LTE-Advanced", R1-094653, 3GPP TSG-RAN1 Meeting#59, Jeju, Korea, Nov. 9-13, 2009

DISCLOSURE OF THE INVENTION

However, according to the conventional technique, in the case where the mobile station apparatus transmits the reference signal for channel estimation A-SRS only when the transmission request is notified from the base station apparatus by use of a physical downlink control channel, the base station apparatus cannot obtain adequate channel estimate accuracy for an uplink. Further, the mobile station apparatus transmits the reference signal that cannot provide adequate channel estimate accuracy, resulting in that a resource of an uplink signal is wasted, and efficient frequency selective scheduling cannot be performed also in the base station apparatus.

When the physical downlink control channel is used each time the base station apparatus requests transmission of the reference signal for channel estimation, a resource of a downlink signal is wasted, and efficient communication between the base station apparatus and the mobile station apparatus cannot be performed.

The present invention has been made in view of the above-mentioned problems and has an object to provide a radio communication system, a base station apparatus, a mobile station apparatus and a radio communication method that can efficiently transmit the reference signal for channel estimation when the transmission request is notified from the base station apparatus, thereby improving the channel estimate accuracy of the uplink.

(1) In order to attain the above-mentioned object, the present invention takes following measures. That is, a radio communication system of an embodiment of the present invention is a radio communication system including a base station apparatus and a mobile station apparatus, wherein the base station apparatus transmits, to the mobile station apparatus, a radio resource control signal (RRC signaling: Radio Resource Control Signaling) including information indicating a number of times of transmission of a reference signal for channel estimation (Repetition number), and transmits, to the mobile station apparatus, a physical downlink control channel including information indicating transmission of the reference signal, and the mobile station apparatus transmits the reference signal to the base station apparatus until a number of times of transmission reaches the number of times of transmission, according to the information indicating the number of times of transmission, which is included in the radio resource control signal, when the information indicating transmission of the reference signal is included in the physical downlink control channel.

As described above, the base station apparatus can instruct the mobile station apparatus to transmit the A-SRS the predetermined number of times according to one transmission request, improving the uplink channel estimate accuracy.

(2) A radio communication system of an embodiment of the present invention is a radio communication system including a base station apparatus and a mobile station apparatus, wherein the base station apparatus transmits, to the mobile station apparatus, a radio resource control signal including information indicating a number of times of transmission of a reference signal for channel estimation, transmits, to the mobile station apparatus, a radio resource control signal including information indicating whether or not to perform frequency hopping of the reference signal, and transmits, to the mobile station apparatus, a physical downlink control channel including information indicating transmission of the reference signal, and the mobile station apparatus transmits, to the base station apparatus, the reference signal while performing frequency hopping until a number of times of transmission reaches the number of times of transmission, according to the information indicating the number of times of transmission and the information indicating frequency hopping, which are included in the radio resource control signals, when the information indicating transmission of the reference signal is included in the physical downlink control channel As described above, by applying frequency hopping, the frequency diversity effect and the interference averaging effect of frequency hopping can be obtained and thus, the base station apparatus achieves efficient frequency selective scheduling, improving the uplink channel estimate accuracy.

(3) A radio communication system of an embodiment of the present invention is a radio communication system including a base station apparatus and a mobile station apparatus, wherein the base station apparatus transmits, to the mobile station apparatus, a radio resource control signal including information indicating a number of times of transmission of a reference signal for channel estimation, transmits, to the mobile station apparatus, a radio resource control signal including information indicating whether or not the mobile station apparatus performs antenna selection and transmits, to the mobile station apparatus, a physical downlink control channel including information indicating transmission of the reference signal, and the mobile station apparatus transmits the reference signal to the base station apparatus while performing antenna selection until a number of times of transmission reaches the number of times of transmission, according to the information indicating the number of times of transmission and the information indicating antenna selection, which are included in the radio resource control signals, when the information indicating transmission of the reference signal is included in the physical downlink control channel.

As described above, by transmitting the A-SRS the predetermined number of times while switching the antenna, the channel estimate accuracy for each antenna can be improved and thus, the base station apparatus can instruct the mobile station apparatus to perform communication using the antenna having a better communication quality. Moreover, since channel estimation of the plurality of antennas can be performed, switching to MIMO (Multiple Input Multiple Output) communication can be efficiently achieved.

(4) In the radio communication system of an embodiment of the present invention, in the mobile station apparatus, a subframe transmitting the reference signal is set for each cell.

(5) In the radio communication system of an embodiment of the present invention, in the mobile station apparatus, a subframe transmitting the reference signal is set for each mobile station apparatus.

(6) In the radio communication system of an embodiment of the present invention, in the mobile station apparatus, a subframe transmitting the reference signal includes a subframe set for each cell and a subframe set for each mobile station apparatus.

As described above, by designating the subframe transmitting the A-SRS, the mobile station apparatus can achieve more flexible A-SRS transmission.

(7) A base station apparatus of an embodiment of the present invention is a base station apparatus that communicates with a mobile station apparatus, the base station apparatus including a transmitter for transmitting, to the mobile station apparatus, a radio resource control signal including information indicating a number of times of transmission of a reference signal for channel estimation, and a transmitter for transmitting, to the mobile station apparatus, a physical downlink control channel including information indicating transmission of the reference signal.

As described above, the base station apparatus of the present invention can instruct the mobile station apparatus to transmit the A-SRS the predetermined number of times with one transmission request.

(8) A base station apparatus of an embodiment of the present invention is a base station apparatus that communicates with a mobile station apparatus, the base station apparatus including a transmitter for transmitting, to the mobile station apparatus, a radio resource control signal including information indicating a number of times of transmission of a reference signal for channel estimation, a transmitter for transmitting, to the mobile station apparatus, a radio resource control signal including information indicating whether or not to perform frequency hopping of the reference signal, and a transmitter for transmitting, to the mobile station apparatus, a physical downlink control channel including information indicating transmission of the reference signal.

As described above, the base station apparatus of the present invention can instruct the mobile station apparatus to transmit the A-SRS the predetermined number of times while performing frequency hopping with one transmission request.

(9) A base station apparatus of an embodiment of the present invention is a base station apparatus that communicates with a mobile station apparatus, the base station apparatus including a transmitter for transmitting, to the mobile station apparatus, a radio resource control signal including information indicating a number of times of transmission of a reference signal for channel estimation, a transmitter for transmitting, to the mobile station apparatus, a radio resource control signal including information indicating whether or not the mobile station apparatus performs antenna selection, and a transmitter for transmitting; to the mobile station apparatus; a physical downlink control channel including information indicating transmission of the reference signal.

As described above, the base station apparatus of the present invention can instruct the mobile station apparatus to transmit the A-SRS the predetermined number of times while performing antenna selection (switching) with one transmission request.

(10) A mobile station apparatus of an embodiment of the present invention is a mobile station apparatus that communicates with a base station apparatus, the mobile station apparatus including a transmitter for transmitting, to the base station apparatus, a reference signal until a number of times of transmission reaches the number of times of transmission, according to information indicating a number of times of transmission, which is included in a radio resource control signal, when the information indicating transmission of the reference signal is included in a physical downlink control channel.

As described above, the mobile station apparatus of the present invention can transmit the A-SRS the predetermined number of times with one transmission request from the base station apparatus.

(11) A mobile station apparatus of an embodiment of the present invention is a mobile station apparatus that communicates with a base station apparatus, the mobile station apparatus including a transmitter for transmitting, to the base station apparatus, a reference signal while performing frequency hopping until a number of times of transmission reaches the number of times of transmission, according to information indicating the number of times of transmission and information indicating frequency hopping, which are included in a radio resource control signal, when the information indicating transmission of the reference signal is included in a physical downlink control channel.

As described above, the mobile station apparatus of the present invention can transmit the A-SRS the predetermined number of times while performing frequency hopping with one transmission request.

(12) A mobile station apparatus of an embodiment of the present invention is a mobile station apparatus that communicates with a base station apparatus, the mobile station apparatus including a transmitter for transmitting, to the base station apparatus, a reference signal while performing antenna selection until a number of times of transmission reaches the number of times of transmission, according to information indicating the number of times of transmission and information indicating antenna selection, which are included in the radio resource control signals, when information indicating transmission of the reference signal is included in a physical downlink control channel.

As described above, the mobile station apparatus of the present invention can transmit the A-SRS the predetermined number of times while performing antenna selection (switching) with one transmission request.

(13) A radio communication method of an embodiment of the present invention is a radio communication method of a radio communication system including a base station apparatus and a mobile station apparatus, the method at least including the steps of: in the base station apparatus, transmitting, to the mobile station apparatus, a radio resource control signal including information indicating a number of times of transmission of a reference signal for channel estimation; and transmitting, to the mobile station apparatus, a physical downlink control channel including information indicating transmission of the reference signal, and in the mobile station apparatus, transmitting, to the base station apparatus, the reference signal until a number of times of transmission reaches the number of times of transmission, according to the information indicating the number of times of transmission, which is included in the radio resource control signal, when the information indicating transmission of the reference signal is included in the physical downlink control channel.

As described above, according to the radio communication method of the present invention, the mobile station apparatus can transmit the A-SRS the predetermined number of times with one transmission request from the base station apparatus.

(14) A radio communication method of an embodiment of the present invention is a radio communication method of a radio communication system including a base station apparatus and a mobile station apparatus, the method at least including the steps of: in the base station apparatus, transmitting, to the mobile station apparatus, a radio resource control signal including information indicating a number of times of transmission of a reference signal for channel estimation, transmitting, to the mobile station apparatus, a radio resource control signal including information indicating whether or not to perform frequency hopping of the reference signal, and transmitting, to the mobile station apparatus, a physical downlink control channel including information indicating transmission of the reference signal, and in the mobile station apparatus, transmitting, to the base station apparatus, the reference signal while performing frequency hopping until a number of times of transmission reaches the number of times of transmission, according to the information indicating the number of times of transmission and the information indicating the frequency hopping, which are included in the radio resource control signals, when the information indicating transmission of the reference signal is included in the physical downlink control channel.

As described above, according to the radio communication method of present invention, the mobile station apparatus can transmit the A-SRS the predetermined number of times while performing frequency hopping with one transmission request from the base station apparatus.

(15) A radio communication method of an embodiment of the present invention is a radio communication method of a radio communication system including a base station apparatus and a mobile station apparatus, the method at least including the steps of: in the base station apparatus, transmitting, to the mobile station apparatus, a radio resource control signal including information indicating a number of times of transmission of a reference signal for channel estimation, transmitting, to the mobile station apparatus, a radio resource control signal including information indicating whether or not the mobile station apparatus performs antenna selection, and transmitting, to the mobile station apparatus, a physical downlink control channel including information indicating transmission of the reference signal, and in the mobile station apparatus, transmitting, to the base station apparatus, the reference signal while performing antenna selection until a number of times of transmission reaches the number of times of transmission, according to the information indicating the number of times of transmission and the information indicating antenna selection, which are included in the radio resource control signal, when the information indicating transmission of the reference signal is included in the physical downlink control channel.

As described above, according to the radio communication method of the present invention, the mobile station apparatus can transmit the A-SRS while performing antenna selection (switching) the predetermined number of times with one transmission request from the base station apparatus.

According to the present invention, it is possible to provide the mobile station apparatus, the base station apparatus, the radio communication system and the radio communication method that can efficiently transmit the reference signal for channel estimation when the transmission request is notified from the base station apparatus, thereby improving the channel estimate accuracy of the uplink.

BEST MODES FOR CARRYING OUT THE INVENTION

Before specifically describing each embodiment, summary of communication technology used in the present invention will be briefly described below.

(Physical Channel)

Physical channels used in the present invention include a physical broadcast channel, physical downlink shared channel, a physical downlink control channel, a downlink reference signal, a physical uplink shared channel, a physical uplink control channel, a physical random access channel and an uplink reference signal. Even when a different type of physical channel is added to the above-mentioned physical channel, each of below-mentioned embodiments of the present invention can be applied.

The physical broadcast channel (PBCH) is transmitted to provide notification of a control parameter (broadcast information) commonly used by the mobile station apparatus in a cell. The broadcast information that is not notified by the physical broadcast channel, a resource of which is notified by the physical downlink control channel, is transmitted by use of the physical downlink shared channel. As the broadcast information, a cell global ID indicating a cell-specific ID (Identity) is notified. In the PBCH, a broadcast channel (BCH) is mapped at intervals of 40 milliseconds. The timing of 40 milliseconds is blind-detected in the mobile station apparatus. That is, due to the timing presentation of the physical broadcast channel, an explicit signaling is not transmitted to the mobile station apparatus. A subframe including the physical broadcast channel (PBCH) is self-decodable.

The physical downlink control channel (PDCCH) is a downlink channel transmitted from the base station apparatus to the mobile station apparatus, which is a channel used to notify the mobile station apparatus of resource allocation of the physical downlink shared channel (PDSCH), hybrid automatic repeat request (HARQ) information for downlink data (DL-SCH: Downlink-Shared Channel) and uplink transmission grant (uplink grant) as resource allocation of the physical uplink shared channel (PUSCH).

The physical downlink shared channel (PDSCH) is a channel used to transmit downlink data (DL-SCH: Downlink-Shared Channel) or paging information.

The downlink reference signal (DL-RS: Downlink Reference Signal or Cell-specific Reference Signal) is transmitted using a downlink from the base station apparatus to the mobile station apparatus. The mobile station apparatus measures the downlink reference signal to determine the reception quality of the downlink. The reception quality is notified to the base station apparatus by use of the physical uplink control channel (PUCCH) or the physical uplink shared channel (PUSCH) as CQI (Channel Quality Indicator), which is quality information indicator. Based on the CQI notified from the mobile station apparatus, the base station apparatus performs scheduling downlink communication to the mobile station apparatus. Examples of the reception quality include SIR (Signal-to-Interference Ratio), SINR (Signal-to-Interference plus Noise Ratio), SNR (Signal-to-Noise Ratio), CIR (Carrier-to-Interference Ratio), BLER (Block Error Rate) and path loss.

The physical uplink shared channel (PUSCH) is a channel used to transmit mainly uplink data (UL-SCH: Uplink Shared Channel). In the case where the base station apparatus schedules the mobile station apparatus, channel status information (downlink channel quality indicator (CQI)), precoding matrix indicator (PMI), rank indicator (RI), and acknowledgement response (ACK: Acknowledgement)/negative acknowledgement response (NACK: Negative Acknowledgement) to the hybrid automatic repeat request (HARQ) for downlink transmission are transmitted by use of the physical uplink shared channel (PUSCH). Here, the uplink data (UL-SCH) indicates, for example, transmission of user data, and the UL-SCH is a transport channel. In the UL-SCH, the HARQ and dynamic adaptive radio link control is supported, and beam forming is available. In the UL-SCH, dynamic resource allocation and quasi-static resource allocation are supported.

The physical uplink control channel (PUCCH) is a channel used to transmit control data. Here, examples of the control data include channel status information (CQI, PMI, RI) transmitted (fed back) from the mobile station apparatus to the base station apparatus, scheduling request (SR) to request resource allocation for transmission of the uplink data by the mobile station apparatus (to request transmission in the UL-SCH) and ACK/NACK to the HARQ for the downlink transmission.

The uplink reference signal (UL-RS) is transmitted from the mobile station apparatus to the base station apparatus. The UL-RS is classified into a sounding reference signal (SRS) and a demodulation reference signal (DM-RS). The sounding reference signal as a reference signal for channel estimation is measured by the base station apparatus to determine the reception quality of an uplink radio transmission signal of the mobile station apparatus, and is used to adjust uplink scheduling and uplink timing synchronization on the basis of the reception quality. The demodulation reference signal is transmitted together with the physical uplink shared channel, and is used as the reference signal for calculating amplitude, phase and frequency change of a signal of the physical uplink shared channel and demodulating the signal transmitted by use of the physical uplink shared channel.

A transmission frequency band of the DM-RS matches a transmission frequency band of the PUSCH, while a transmission frequency band of the SRS is set independently of the transmission frequency band of the DM-RS. That is, the transmission frequency band of the SRS does not necessarily match the transmission frequency band of the PUSCH and is previously set by the base station apparatus. Frequency hopping is applied to the SRS in a time axis direction. By using the frequency hopping, the SRS can obtain a frequency diversity effect and an interference averaging effect. A first reference signal (A-SRS: Aperiodic SRS) for channel estimation is a reference signal for channel estimation transmitted upon request from the base station apparatus, and a subframe transmitting the first reference signal may be set by use of the physical downlink control channel by the base station apparatus, or may be set by use of a radio resource control signal (RRC signaling).

A second reference signal (P-SRS: Periodic SRS) for channel estimation is a reference signal for channel estimation transmitted according to a transmission periodicity previously set by the base station apparatus, a subframe transmitting the second reference signal may be set by use of the radio resource control signal by the base station apparatus, or may be set by use of the broadcast channel. Configuration information on SRS parameters such as the transmission periodicity and the transmission frequency band of each of the first reference signal and the second reference signal may be previously set by the base station apparatus and then, the radio resource control signal including the configuration information may be transmitted to the mobile station apparatus. The subframe transmitting the reference signal for channel estimation (the subframe transmitting the first reference signal and the subframe transmitting the second reference signal) may be set for each cell, set for each mobile station apparatus or set for each component carrier, or the subframe transmitting the first reference signal and the subframe transmitting the second reference signal may be the same as each other or different from each other. For example, the base station apparatus may set the subframe transmitting the first reference signal for each mobile station apparatus, and set the subframe transmitting the second reference signal for each cell.

The physical random access channel (PRACH) is a physical channel used to transmit a random access preamble, and has guard time. The PRACH has a main object to allow the mobile station apparatus to synchronize with the base station apparatus, and is also used for initial access, handover, reconnection request and scheduling request.

The scheduling request is information that the mobile station apparatus requests resource allocation of the physical uplink shared channel to the base station apparatus. When the mobile station apparatus accumulates information data to be transmitted in its buffer and requests resource allocation of the physical uplink shared channel, the mobile station apparatus transmits the scheduling request. Using the physical uplink control channel previously allocated by the base station apparatus, the mobile station apparatus also transmits the scheduling request to the base station apparatus. At start of communication connection with the mobile station apparatus, the base station apparatus allocates a periodic resource for arrangement of the scheduling request by the mobile station apparatus.

(SRS Resource Allocation and Frequency Hopping)

Figure 6:
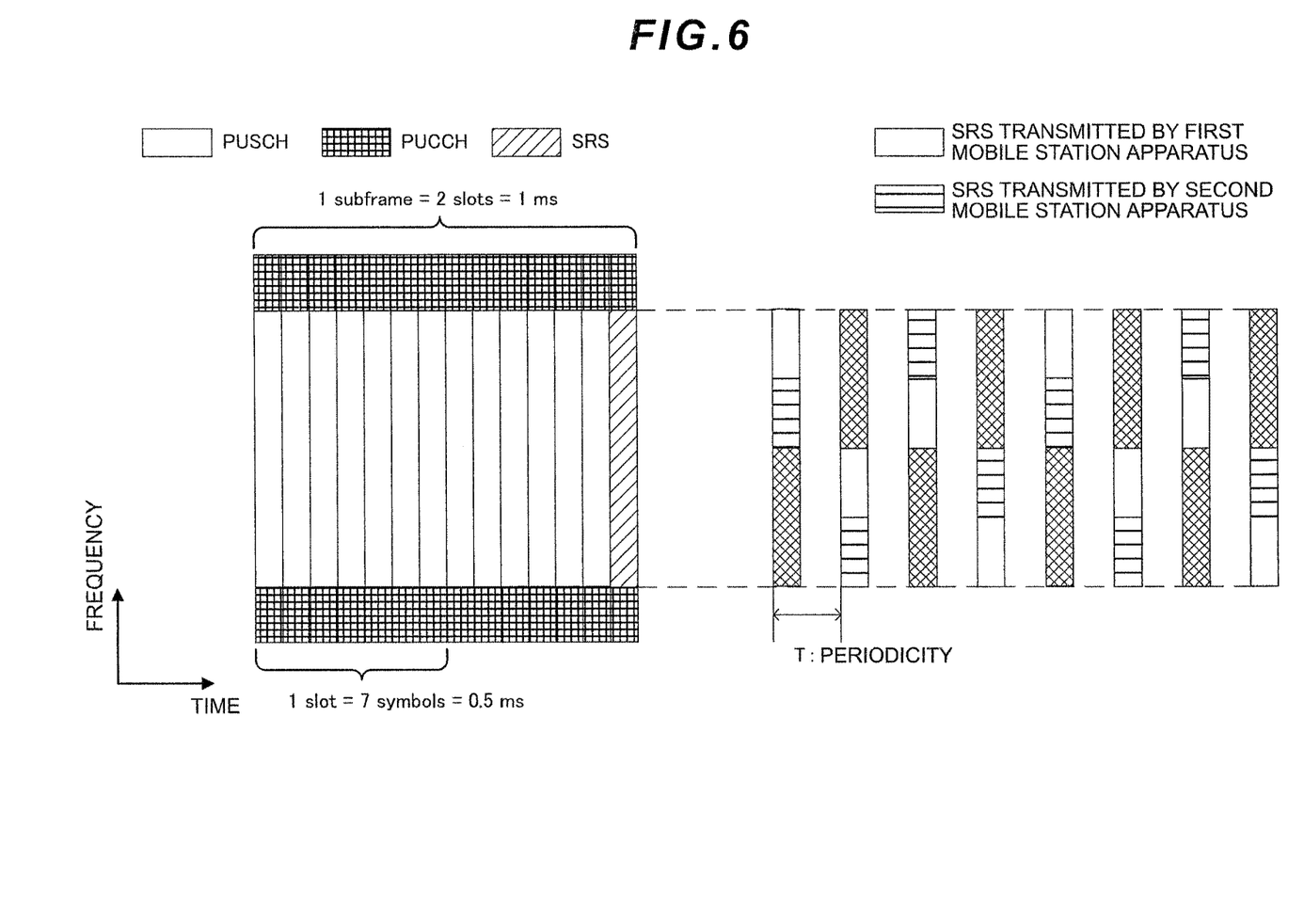
FIG. 6 is a view schematically showing a configuration of SRS resource allocation and frequency hopping (FH) according to the present invention.

FIG. 6 is a view schematically showing a configuration of SRS resource allocation and frequency hopping (FH). In this figure, a horizontal axis represents time and a vertical axis represents frequency. A left side shows one example of SRS resource allocation. In the example of the left side in this figure, 14 symbols are aligned in the time axis direction. Seven symbols correspond to 1 slot, and a length of 1 slot is 0.5 milliseconds (ms). The 14 symbols (corresponding to 2 slots) correspond to 1 subframe, and a length of 1 subframe is 1 millisecond. In the uplink signal in which 1 subframe is composed of 14 symbols, for example, the SRS is allocated to the $14^{th}$ symbol. The resource (bandwidth in the frequency direction) of the SRS allocated to the $14^{th}$ symbol is set according to an uplink system bandwidth and transmit power of the mobile station apparatus. The PRACH can change bandwidth and time symbol length according to the type and format of a message to be transmitted and allocate them.

The frequency hopping changing frequency position at each transmission is applied in the time axis direction. A right side in this figure shows one example of SRS frequency hopping. In the left side in this figure, the SRS is transmitted every transmission periodicity T, and as shown in the figure, hopping is performed in the frequency direction every periodicity T (that is, in each transmission).

<First Embodiment>

First embodiment will be described below. In First embodiment, a base station apparatus 1 transmits the radio resource control signal including information indicating the number of times of transmission of a reference signal for channel estimation to a mobile station apparatus 3, and transmits a physical downlink control channel including information indicating transmission of the reference signal to the mobile station apparatus 3. The mobile station apparatus 3 sets the number of times of transmission of the reference signal according to the information indicating the number of times of transmission, which is included in the radio resource control signal, and when the information indicating transmission of the reference signal is included in the physical downlink control channel, the mobile station apparatus 3 transmits the reference signal to the base station apparatus 1. In First embodiment, when information indicating transmission of the A-SRS is included in the PDCCH, the mobile station apparatus 3 can transmit the A-SRS the predetermined number of times.

Figure 1:
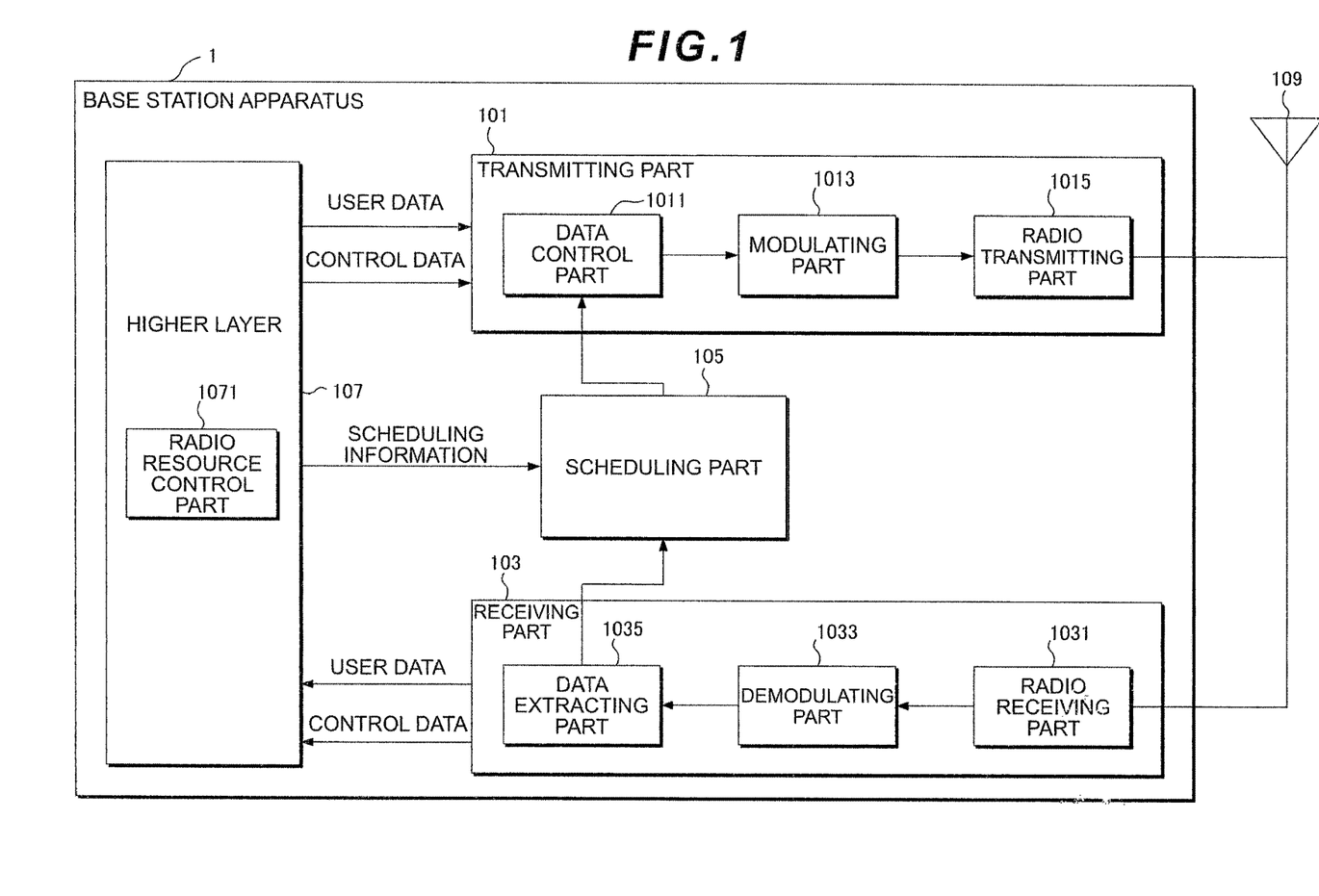
FIG. 1 is a block diagram schematically showing a functional structure of a base station apparatus 1 of the present invention.

FIG. 1 is a block diagram schematically showing a functional structure of the base station apparatus 1 according to the present invention. The base station apparatus 1 includes a transmitting part 101, a receiving part 103, a scheduling part 105, a higher layer 107 and an antenna 109. The transmitting part 101 includes a data control part 1011, a modulating part 1013 and a radio transmitting part 1015.

The receiving part 103 includes a radio receiving part 1031, a demodulating part 1033 and a data extracting part 1035. The data control part 1011 receives inputs of user data and control data, and according to an instruction from the scheduling part 105, arranges the control data in the PDCCH and arranges transmit data to each mobile station apparatus 3 and the control data in the PDSCH. The modulating part 1013 executes signal processing such as data modulation, serial/parallel conversion of an input signal, IFFT, CP insertion and filtering, and generates a transmission signal. The radio transmitting part 1015 upconverts modulated data to a radio frequency and then, transmits it to the mobile station apparatus 3 via the antenna 109.

The radio receiving part 1031 receives an uplink signal from the mobile station apparatus 3, down converts it to a baseband signal and outputs received data to the demodulating part 1033. The data extracting part 1035 confirms whether or not the received data is correct, and notifies a confirmation result to the scheduling part 105. When the received data is correct, the data extracting part 1035 divides the received data into the user data and the control data. The data extracting part 1035 outputs control data of the second layer in the control data, such as downlink channel quality instruction information and acknowledgment/negative acknowledgment (ACK/NACK) of downlink data, to the scheduling part 105, and outputs the control data of the third layer and the user data to the higher layer 107. When the received data is incorrect, the data extracting part 1035 stores the received data for synthesis with retransmission data, and when receiving the retransmission data, executes synthesis processing.

The scheduling part 105 performs scheduling for arranging the user data and the control data in the PDSCH and the PDCCH.

The higher layer 107 executes processing of a medium access control (MAC) layer, a radio link control (RLC) layer, a packet data convergence protocol (PDCP) layer and a radio resource control (RRC) layer. An interface (not shown) between the higher layer 107, and the scheduling part 105, the antenna 109, the transmitting part 101, the receiving part 103 exists such that the higher layer 107 controls the processing parts of the lower layer together.

The higher layer 107 also uses a radio resource control part 1071 (also referred to as a control part). The radio resource control part 1071 performs management of various configuration information, management of system information, paging control, management of a communication status of each mobile station apparatus 3, mobility management such as handover, management of a buffer status of each mobile station apparatus 3, management of connection configuration of unicast and multicast bearers and management of a mobile station identifier (UEID). The higher layer 107 exchanges information with another base station apparatus 1 and an upper node.

Figure 2:
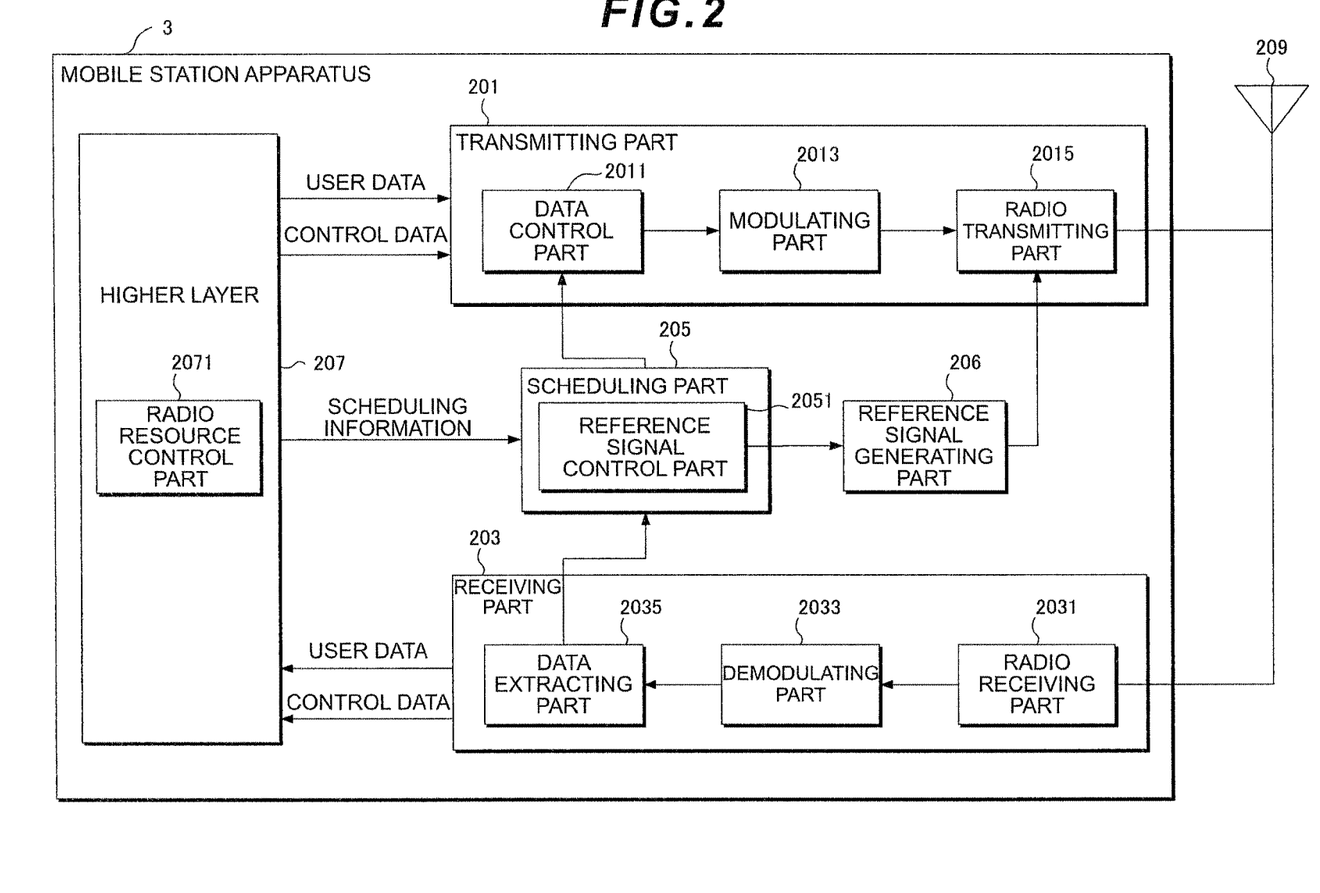
FIG. 2 is a block diagram schematically showing a functional structure of a mobile station apparatus 3 of the present invention.

FIG. 2 is a block diagram schematically showing a functional structure of the mobile station apparatus 3 according to the present invention. The mobile station apparatus 3 includes a transmitting part 201, a receiving part 203, a scheduling part 205, a higher layer 207 and an antenna 209. The transmitting part 201 includes a data control part 2011, a modulating part 2013 and a radio transmitting part 2015. The receiving part 203 includes a radio receiving part 2031, a demodulating part 2033 and a data extracting part 2035.

The user data and the control data are input from the higher layer 207 to the data control part 2011. According to an instruction from the scheduling part 205, the data control part 2011 arranges input data in the PUSCH and the PUCCH. The modulating part 2013 modulates the data in the PUSCH and the PUCCH and outputs modulated data to the radio transmitting part 2015. The radio transmitting part 2015 applies signal processing, such as discrete Fourier transform (DFT), subcarrier mapping, inverse fast Fourier transform (IFFT), CP (Cyclic Prefix) insertion and filtering, to the modulated data and an uplink reference signal to generate a transmission signal, upconverts it to radio frequency and then, transmits it to the base station apparatus 1 via the antenna 209.

The radio receiving part 2031 receives a downlink signal from the base station apparatus 1, downconverts the signal to a baseband signal and outputs the received signal to the demodulating part 2033. The demodulating part 2033 demodulates received data. The data extracting part 2035 divides the received data into the user data and the control data. The data extracting part 2035 outputs the control data about scheduling information, random access response message and intermittent reception control, and other control data of the second layer to the control data scheduling part 205, and outputs the user data to the higher layer 207.

The scheduling part 205 analyzes the control data input from the data extracting part 2035 and generates uplink scheduling information, and based on the scheduling information, instructs the data control part 2011 to allocate the user data and the control data to the PUSCH and the PUCCH.

The scheduling part 205 further includes a reference signal control part 2051. The reference signal control part 2051 extracts SRS configuration information on the basis of the scheduling information transmitted from the base station apparatus 1. Various parameters of the first reference signal (A-SRS) and the second reference signal (P-SRS) are set based on the SRS configuration information. Transmission control in the case where the first reference signal and the second reference signal for channel estimation, and the physical uplink control channel occur in the same timing is performed to generate SRS transmission control information. The reference signal control part 2051 outputs the SRS configuration information and the SRS transmission control information to a reference signal generating part 206.

Based on the SRS configuration information and the SRS transmission control information, which are input from the reference signal control part 2051, the reference signal generating part 206 generates the first reference signal and/or the second reference signal and outputs the generated signal to the radio transmitting part 2015.

The higher layer 207 executes processing of the medium access control (MAC) layer, the radio link control (RLC) layer, the packet data convergence protocol (PDCP) layer and the radio resource control (RRC) layer. An interface (not shown) between the higher layer 207, and the scheduling part 205, the antenna 209, the transmitting part 201, the receiving part 203 exists such that the higher layer 207 controls the processing parts of the lower layer together.

The higher layer 207 has a radio resource control part 2071 (hereinafter referred to as a control part). The radio resource control part 2071 performs management of various configuration information, management of system information, paging control, management of a communication status of a local station, mobility management such as handover, management of a buffer status, management of connection configuration of unicast and multicast bearers and management of a mobile station identifier (UEID).

Figure 3:
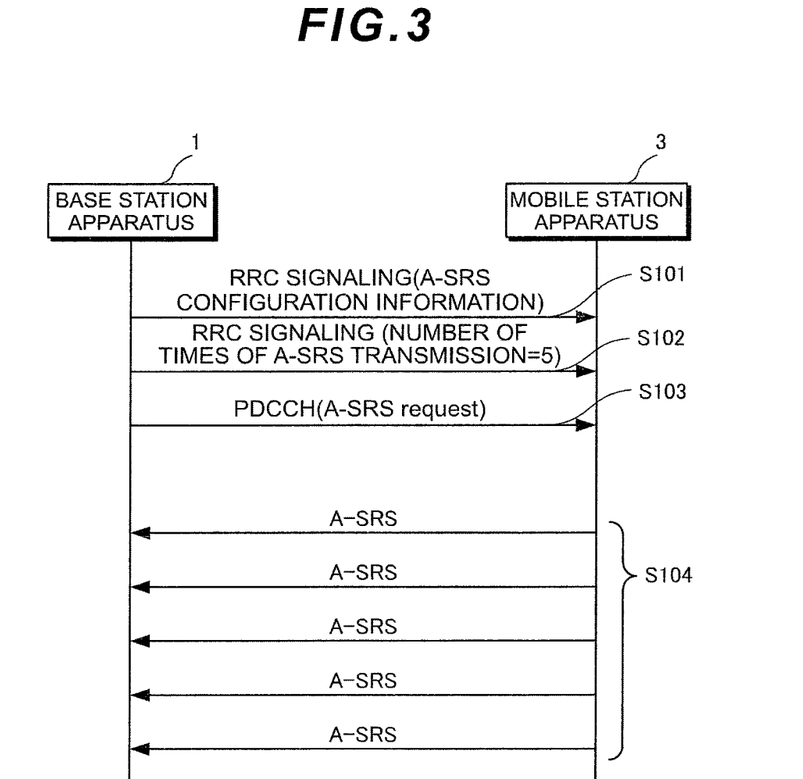
FIG. 3 is a view showing one example of signaling for A-SRS transmission in accordance with First embodiment of the present invention.

FIG. 3 is a view showing one example of signaling for A-SRS transmission in accordance with First embodiment of the present invention. First, the base station apparatus 1 transmits the radio resource control signal including the A-SRS configuration information to the mobile station apparatus 3 (Step S101). The base station apparatus 1 transmits the radio resource control signal including information indicating the number of times of A-SRS transmission (for example, the number of times of transmission is five) to the mobile station apparatus 3 (Step S102). According to the A-SRS configuration information included in the radio resource control signal transmitted from the base station apparatus 1, the mobile station apparatus 3 sets various parameters of the A-SRS (including the number of times of transmission). When the PDCCH including information indicating A-SRS transmission from the base station apparatus 1 is transmitted to the mobile station apparatus 3 (Step S103), the mobile station apparatus 3 transmits the A-SRS to the base station apparatus 1 until the number of times of transmission reaches the predetermined number of times (Step S104).

Here, the PDCCH includes a TPC (Transmit Power Control) command for A-SRS transmission. That is, according to the TPC command included in the PDCCH, the mobile station apparatus 3 transmits the A-SRS to the base station apparatus 1. Here, the information indicating the number of times of A-SRS transmission may be included in the A-SRS configuration information. The parameters set by the SRS configuration information are the transmission frequency band and the transmission periodicity for A-SRS transmission and the transmission frequency band and the transmission periodicity for P-SRS transmission. At this time, when receiving an instruction of simultaneous transmission via a plurality of antennas from the base station apparatus 1, the mobile station apparatus 3 may simultaneously transmit the A-SRS via the plurality of antennas. When receiving a new PDCCH including information indicating A-SRS transmission before the number of times of transmission reaches the predetermined number of times, the mobile station apparatus 3 may ignore the information included in the new received PDCCH and transmit the A-SRS until the number of times of transmission of the reference signal reaches the predetermined number of times, or may stop transmission of A-SRS being transmitted, resets the number of times the mobile station apparatus 3 transmits the A-SRS, and transmit the new A-SRS requested from the base station apparatus 1 to the base station apparatus 1 until the number of times of transmission reaches the predetermined number of times.

When the A-SRS and the P-SRS are allocated in the same component carrier and in the same timing before the number of times of transmission reaches the predetermined number of times, the mobile station apparatus 3 drops (does not transmit) the P-SRS and transmits the A-SRS to the base station apparatus 1. Here, that the A-SRS and the P-SRS are allocated in the same timing means that, describing with reference to the left side in FIG. 6, one mobile station apparatus 3 simultaneously arranges and transmits the A-SRS and the P-SRS to the 14$^{th}$ symbol (shadow area) to which the A-SRS and the P-SRS are transmitted according to an instruction of the base station apparatus 1, and the transmission timing matches in units of symbol. The mobile station apparatus 3 can determine whether or not the A-SRS and the P-SRS are allocated in the 14$^{th}$ symbol in the same timing.

Here, the base station apparatus 1 may set the subframe transmitting the A-SRS for each cell or for each mobile station apparatus 3. The subframe transmitting the A-SRS may include the subframe set for each cell and the subframe set for each mobile station apparatus 3. In the radio communication system that performs communication using a plurality of component carriers, the base station apparatus 1 may set the subframe transmitting the A-SRS for each component carrier. In the radio communication system that performs communication using a plurality of antennas, such as MIMO (Multiple Input Multiple Output) communication, the base station apparatus 1 may set the subframe transmitting the A-SRS for each antenna.

In the mobile station apparatus 3 that performs communication with the base station apparatus 1 using the plurality of component carriers, in the case where information indicating the uplink component carrier transmitting the PUSCH together with information indicating A-SRS transmission are included, according to the information indicating the component carrier, the mobile station apparatus 3 transmits the A-SRS by using the same uplink component carrier as the uplink component carrier transmitting the PUSCH. That is, when receiving the radio resource control signal including the A-SRS configuration information and the number of times of A-SRS transmission from the base station apparatus 1, the mobile station apparatus 3 transmits the A-SRS by using the same uplink component carrier as the uplink component carrier transmitting the PUSCH until the number of times of transmission reaches the predetermined number of times of transmission. At this time, parameters for the A-SRS transmission are parameters set for the same uplink component carrier as the uplink component carrier transmitting the PUSCH. For example, the TPC command included in the PDCCH is applied to PUSCH transmission and A-SRS transmission of the uplink component carrier indicated by the PDCCH.

Here, the component carrier may be allocated in the contiguous frequency bands or non-contiguous frequency bands, and the base station apparatus 1 and the mobile station apparatus 3 can aggregate a plurality of component carriers as the contiguous and/or non-contiguous frequency bands to configure a wide system band (frequency band), and use the plurality component carriers in a composite manner, realizing high-speed data communication (information transmission/reception). The downlink frequency band and the uplink frequency band, which are each configured of the component carrier, do not necessarily have the same bandwidth, and the base station apparatus 1 and the mobile station apparatus 3 can perform communication by using the downlink frequency band and the uplink frequency band that are composed of the component carriers and have different bandwidths (asymmetric frequency band aggregation: asymmetric carrier aggregation).

As described above, in First embodiment of the present invention, when the information indicating A-SRS transmission is included in the PDCCH, the mobile station apparatus 3 can transmit the A-SRS the predetermined number of times. Here, the predetermined number of times means the number of times of A-SRS transmission, which is previously set by the base station apparatus 1.

In First embodiment of the present invention, when the information indicating A-SRS transmission is included in the PDCCH, the uplink channel estimate accuracy can be improved by transmitting the A-SRS with the predetermined number of times. Further, since the A-SRS can be transmitted plural times with one notification, signaling for the A-SRS transmission request can be reduced, realizing efficient A-SRS transmission.

<Second Embodiment>

Next, Second embodiment will be described. In Second embodiment, the base station apparatus 1 transmits the radio resource control signal including information indicating the number of times of A-SRS transmission to the mobile station apparatus 3, transmits the radio resource control signal including information indicating whether or not to perform frequency hopping of the A-SRS to the mobile station apparatus 3, and transmits the physical downlink control channel including information indicating A-SRS transmission to the mobile station apparatus 3. The mobile station apparatus 3 sets the number of times of A-SRS transmission according to the information indicating the number of times of A-SRS transmission, which is included in the radio resource control signal, sets whether or not to perform frequency hopping according to the information indicating whether or not to perform frequency hopping of the A-SRS, which is included in the radio resource control signal, and transmits the A-SRS to the base station apparatus 1 when the information indicating A-SRS transmission is included in the physical downlink control channel.

Since the functional structures of the apparatuses in Second embodiment are the same as those in First embodiment, description thereof is omitted. In Second embodiment, when the A-SRS transmission request is sent to the mobile station apparatus 3, the channel estimate accuracy can be improved by transmitting the A-SRS plural times while performing frequency hopping. Use of frequency hopping can decrease the transmission frequency band of the SRS transmitted at one time. Moreover, since transmit power per subcarrier can be increased and the frequency diversity effect and the interference averaging effect of frequency hopping can be obtained, the channel estimate accuracy can be improved.

Figure 4:
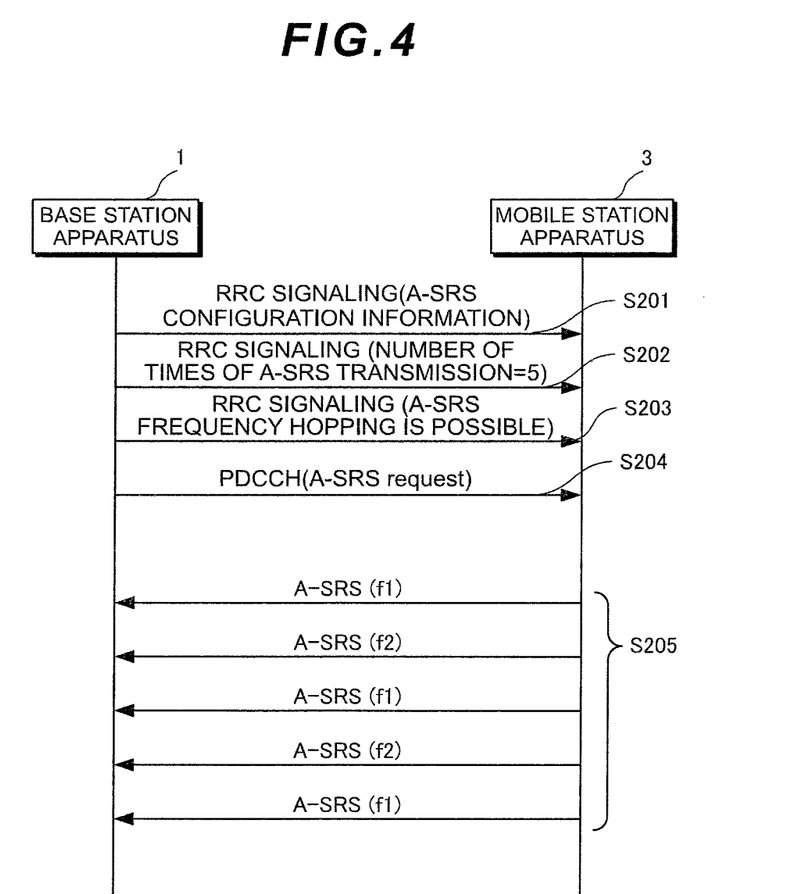
FIG. 4 is a view showing one example of signaling for A-SRS transmission in accordance with Second embodiment of the present invention.

FIG. 4 is a view showing one example of signaling for A-SRS transmission in accordance with Second embodiment of the present invention. The base station apparatus 1 transmits the radio resource control signal including the A-SRS configuration information to the mobile station apparatus 3 (Step S201). The base station apparatus 1 transmits the radio resource control signal including the information indicating the number of times of A-SRS transmission (for example, the number of times of transmission is 5) to the mobile station apparatus 3 (Step S202). The base station apparatus 1 transmits the radio resource control signal including information indicating whether or not frequency hopping is possible to the mobile station apparatus 3 (Step S203). According to the A-SRS configuration information included in the radio resource control signal transmitted from the base station apparatus 1, the mobile station apparatus 3 sets various parameters of the A-SRS (including the number of times of transmission and whether or not frequency hopping is possible). Further, when the base station apparatus 1 transmits the PDCCH including the information indicating A-SRS transmission to the mobile station apparatus 3 (Step S204), the mobile station apparatus 3 transmits the A-SRS to the base station apparatus 1 until the number of times of transmission of the reference signal reaches the predetermined number of times of transmission (Step S205).

Here, in the case where information indicates that frequency hopping is possible, the mobile station apparatus 3 transmits the A-SRS to the base station apparatus 1 while performing frequency hopping of the A-SRS until the number of times of transmission reaches the predetermined number of times. Here, that frequency hopping of the A-SRS is possible means that the base station apparatus 1 sets the transmission frequency band of the A-SRS to be smaller than the bandwidth for frequency hopping, and the mobile station apparatus 3 compare the transmission frequency band of the A-SRS with the bandwidth for frequency hopping to determine whether or not frequency hopping is performed. However, the information indicating the number of times of A-SRS transmission and the information indicating whether or not frequency hopping is possible may be included in the A-SRS configuration information. Here, the parameters set by the SRS configuration information are the transmission frequency band and the transmission periodicity for A-SRS transmission and the transmission frequency band and the transmission periodicity for P-SRS transmission. In the case where a frequency domain (resource domain) in which the A-SRS can be allocated is divided into f1 and f2, the mobile station apparatus 3 transmits the A-SRS to the base station apparatus 1 while switching the frequency domain in which the A-SRS is allocated between f1 and f2.

Since the subframe transmitting the A-SRS is the same as that in First embodiment, description thereof is omitted.

Since the component carrier transmitting the A-SRS is the same as that in First embodiment, description thereof is omitted.

As described above, in Second embodiment of the present invention, in the case where the information indicating A-SRS transmission is indicated in the PDCCH, the A-SRS can be transmitted the predetermined number of times while performing frequency hopping.

In Second embodiment of the present invention, the mobile station apparatus 3 can set frequency hopping with only one SRS transmission request and thus, can achieve efficient SRS transmission and frequency hopping. Due to the effect of frequency hopping, the base station apparatus 1 can improve the channel estimate accuracy and perform efficient frequency selection scheduling.

<Third Embodiment>

Next, Third embodiment will be described. In Third embodiment, the base station apparatus 1 transmits the radio resource control signal including the information indicating the number of times of A-SRS transmission to the mobile station apparatus 3, transmits the radio resource control signal including information indicating whether or not antenna selection is made to the mobile station apparatus 3, and transmits the physical downlink control channel including the information indicating A-SRS transmission to the mobile station apparatus 3. The mobile station apparatus 3 sets the number of times of A-SRS transmission according to the information indicating the number of times of A-SRS transmission, which is included in the radio resource control signal, sets whether or not antenna selection is made according to the information indicating whether or not antenna selection is made, which is included in the radio resource control signal, and transmits the A-SRS to the base station apparatus 1 when the information indicating A-SRS transmission is included in the physical downlink control channel. Here, antenna selection means that, in the case where a plurality of transmitting antennas are set for the mobile station apparatus 3, the base station apparatus 1 can previously designate the antenna transmitting the uplink signal to the mobile station apparatus 3 or instruct switching of the transmitting antenna and transmission.

Since the functional structures of the apparatuses in Third embodiment are the same as those in First embodiment, description thereof is omitted. In Third embodiment, transmission control in the case of transmitting the A-SRS while switching the plurality of antennas will be described.

Figure 5:
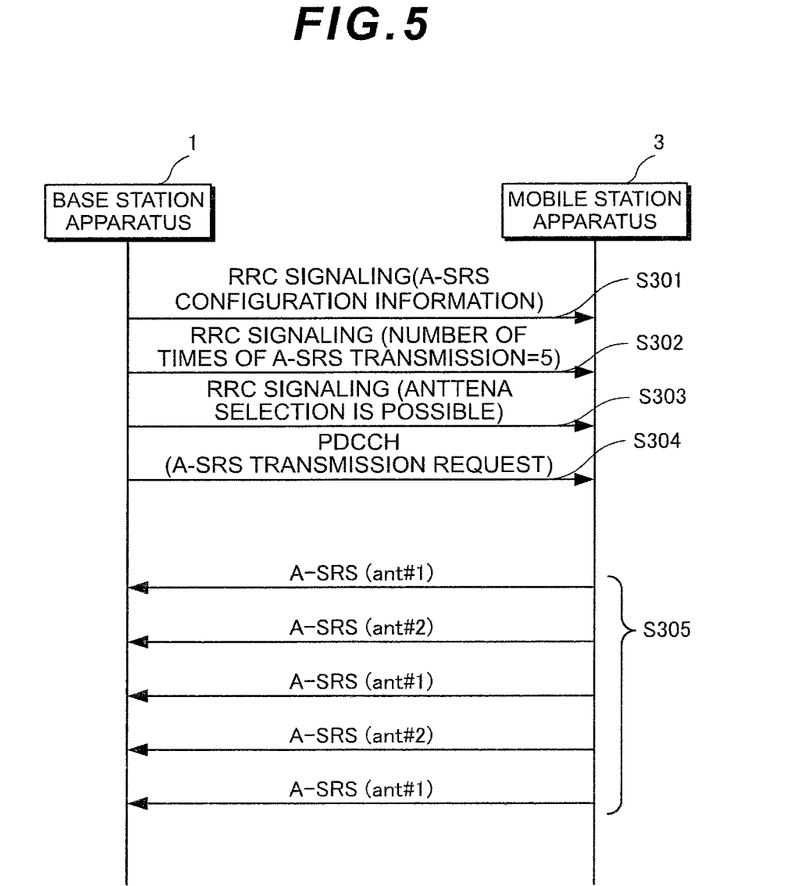
FIG. 5 is a view showing one example of signaling for A-SRS transmission in accordance with Third embodiment of the present invention.

FIG. 5 is a view showing one example of signaling for A-SRS transmission in accordance with Third embodiment of the present invention. The base station apparatus 1 transmits the radio resource control signal including the A-SRS configuration information to the mobile station apparatus 3 (Step S301). The base station apparatus 1 transmits the radio resource control signal including information indicating the number of times of A-SRS transmission (for example, the number of times of transmission is 5) to the mobile station apparatus 3 (Step S302). The base station apparatus 1 transmits the radio resource control signal including the information indicating whether or not antenna selection is possible to the mobile station apparatus 3 (Step S303). According to the A-SRS configuration information included in the radio resource control signal transmitted from the base station apparatus 1, the mobile station apparatus 3 sets various parameters of the A-SRS (including the number of times of transmission and whether or not antenna selection is possible). When the base station apparatus 1 transmits the PDCCH including the information indicating A-SRS transmission to the mobile station apparatus 3 (Step S304), the mobile station apparatus 3 transmits the A-SRS to the base station apparatus 1 until the number of times of transmission reaches the predetermined number of times (Step S305).

Here, in the case where the information indicates that antenna selection is possible, the mobile station apparatus 3 transmits the A-SRS to the base station apparatus 1 while performing antenna selection until the number of times of transmission of the reference signal reaches the predetermined number of times. However, the information indicating the number of times of A-SRS transmission and the information indicating whether or not antenna selection is possible may be included in the A-SRS configuration information. Here, the parameters set by the SRS configuration information are the transmission frequency band and the transmission periodicity. In the case where the antennas of the mobile station apparatus 3 that can select the antenna are ant#1 and ant"2, the mobile station apparatus 3 transmits the A-SRS to the base station apparatus 1 while switching between ant#1 and ant#2.

Since the subframe transmitting the A-SRS is the same as that in First embodiment, description thereof is omitted.

Since the component carrier transmitting the A-SRS is the same as that in First embodiment, description thereof is omitted.

As described above, in Third embodiment of the present invention, in the case where the information indicating A-SRS transmission is indicated in the PDCCH, the mobile station apparatus 3 can transmit the A-SRS the predetermined number of times while selecting (switching) the antenna.

In Third embodiment of the present invention, since the mobile station apparatus 3 can transmit the A-SRS via the plurality of antennas through antenna selection, and the base station apparatus 1 can use the received A-SRS to estimate channel for each antenna, efficient channel estimation using the plurality of antennas can be achieved. Further, the base station apparatus 1 can select the transmitting antenna having a better communication status with the mobile station apparatus 3, or can switch communication to MIMO (Multiple Input Multiple Output) communication requiring transmission using a plurality of antennas. Note that First to Third embodiments may be implemented in combination.

It is to be noted that some of functions of the base station apparatus 1 and the mobile station apparatus 3 in the above-mentioned embodiments may be implemented by a computer. This may be achieved by recording a program for implementing the control functions in a computer-readable recording medium, reading the program recorded in the recording medium and executing the program.

Note that the "computer system" includes OS and hardware such as peripheral devices. The "computer-readable recording medium" refers to portable media such as a flexible disc, a magneto-optical disc, a ROM and a CD-ROM, and memories such as a hard disc built in the computer system. The "computer-readable recording medium" may include one that dynamically holds a program for a short time, such as a communication line in the case where the program is transmitted via a network such as Internet or the communication line such as a phone line, and one that holds the program for a certain time, such as a nonvolatile memory in the computer system as a server or a client. The program may perform a part of the above-mentioned function, or may perform the above-mentioned function by combination with a program previously recorded in the computer system.

A part or all of the mobile station apparatus 3 and the base station apparatus 1 in the above-mentioned embodiments may be implemented as an LSI (Large Scale Integration) typically as an integrated circuit. The functional blocks of the mobile station apparatus 3 and the base station apparatus 1 may be individually formed into a chip, or a part or all of them may be integrated and formed into a chip. The integrated circuit is not limited to the LSI and may be realized by a dedicated circuit or a general-purpose processor. With the emergence of a new technology for circuit integration in place of the LSI through progress of the semiconductor technology, the integrated circuit according to the technology can be used.

Although the embodiments of the present invention have been described in detail with reference to figures, a specific configuration is not limited to these embodiments, and any design that does not deviate from the subject matter of the present invention falls within the scope of Claims.

DESCRIPTION OF SYMBOLS 1 base station apparatus
3 mobile station apparatus
101 transmitting part (base station-side transmitting part)
103 receiving part (base station-side receiving part)
105 scheduling part
109 antenna
201 transmitting part (mobile station-side transmitting part)
203 receiving part (mobile station-side receiving part)
205 scheduling part
206 reference signal generating part
209 antenna
1011 data control part
1013 modulating part
1015 radio transmitting part
1031 radio receiving part
1033 demodulating part
1035 data extracting part
1071 radio resource control part
2011 data control part
2013 modulating part
2015 radio transmitting part
2031 radio receiving part
2033 demodulating part
2035 data extracting part
2051 reference signal control part
2071 radio resource control part

The invention claimed is:

1. A mobile station apparatus comprising:
reception circuitry configured to:
receive a first radio resource control signal including first information on a parameter set for a sounding reference signal; and
receive a second radio resource control signal including second information on whether or not antenna selection for transmission of the sounding reference signal is enabled; and
transmission circuitry configured to:
transmit the sounding reference signal on multiple antennas based on the first information; wherein
the transmission circuitry is configured to:
determine simultaneous transmission of the sounding reference signal on the multiple antennas, in a first case that a first parameter for the simultaneous transmission is included in the parameter set; and
select one antenna of the multiple antennas based on a second parameter, the second parameter indicating a periodicity for the sounding reference signal and the second parameter included in the parameter set, in a second case that the second information indicates the antenna selection is enabled,
the selected one antenna used for the transmission of the sounding reference signal.

2. A base station apparatus comprising:
transmission circuitry configured to:
transmit a first radio resource control signal including first information on a parameter set for a sounding reference signal; and
transmit a second radio resource control signal including second information on whether or not antenna selection for transmission of the sounding reference signal is enabled; and
reception circuitry configured to:
receive the sounding reference signal on the multiple antennas based on the first information; wherein
the reception circuitry is configured to:
receive the sounding reference signal transmitted simultaneously on the multiple antennas, in a first case that a first parameter for the simultaneous transmission is included in the parameter set; and
receive the sounding reference signal transmitted on a selected one antenna of the multiple antennas, the one antenna selected by a mobile station apparatus based on a second parameter, the second parameter indicating a periodicity for the sounding reference signal and the second parameter included in the parameter set, in a second case that second information indicates the antenna selection is enabled.

3. A communication method for a mobile station apparatus, comprising:
receiving a first radio resource control signal including first information on a parameter set for a sounding reference signal;
receiving a second radio resource control signal including second information on whether or not antenna selection for transmission of the sounding reference signal is enabled; and
transmitting the sounding reference signal on the multiple antennas based on the first information; wherein
in a first case that a first parameter for the simultaneous transmission is included in the parameter set,
determining simultaneous transmission of the sounding reference signal on the multiple antennas; and
in a second case that the second information indicates the antenna selection is enabled, selecting one antenna of the multiple antennas based on a second parameter, the second parameter included in the parameter set, the selected one antenna used for the transmission of the sounding reference signal.

4. A communication method for a base station apparatus, comprising:
- transmitting a first radio resource control signal including first information on a parameter set for a sounding reference signal;
- transmitting a second radio resource control signal including second information on whether or not antenna selection for transmission of the sounding reference signal is enabled; and
- receiving the sounding reference signal on the multiple antennas based on the first information; wherein
- receive the sounding reference signal transmitted simultaneously on the multiple antennas, in a first case that a first parameter is a first parameter for the simultaneous transmission included in the parameter set; and
- receiving the sounding reference signal transmitted on a selected one antenna of the multiple antennas, the one antenna selected by a mobile station apparatus based on a second parameter, the second parameter included in the parameter set, in a second case that the second information indicates the antenna selection is enabled.

* * * * *